US005455401A

United States Patent [19]

Dumais et al.

[11] Patent Number: 5,455,401

[45] Date of Patent: Oct. 3, 1995

[54] PLASMA TORCH ELECTRODE

[75] Inventors: Debbie A. Dumais, Loomis; Mueggenburg H. Harry, Carmichael; Brad J. Anderson, Cameron Park; Scott N. Sieger, Fair Oaks, all of Calif.

[73] Assignee: Aerojet General Corporation, Rancho Cardova, Calif.

[21] Appl. No.: 321,707

[22] Filed: Oct. 12, 1994

[51] Int. Cl.[6] .................................................. B23K 10/00

[52] U.S. Cl. ............... 219/121.52; 219/119; 219/121.48; 219/121.49

[58] Field of Search ..................................... 219/118, 119, 219/121.52, 121.42, 121.48, 121.51, 74, 75, 121.49; 313/231.21, 231.31, 231.41

[56] References Cited

U.S. PATENT DOCUMENTS

| | | | |
|---|---|---|---|
| 3,140,421 | 7/1964 | Spongberg | 219/121.52 |
| 3,304,774 | 2/1967 | Poole | 219/121.52 |
| 4,780,591 | 10/1988 | Bernecki et al. | 219/121.52 |

*Primary Examiner*—Mark H. Paschall

*Attorney, Agent, or Firm*—Townsend and Townsend and Crew

[57] ABSTRACT

An electrode for a plasma torch comprises multiple platelets that are stacked together. The platelets have openings that are oriented to form a bore through the electrode adapted for generating a plasma arc. The platelets also have apertures arranged to form multiple coolant channels through the electrode. The coolant channels are immediately adjacent to the bore and extend substantially along the entire length of the bore. This increases the heat transfer area between liquid coolant flowing through the channels and the hot plasma arc within the bore to reduce the temperature of the exposed electrode surface, thereby increasing the lifetime of the electrode. A second set of passages can exist within the electrode to inject gas through the electrode wall at the surface of the bore. This secondary gas injection is directed tangential to the bore surface to create or enhanced gas swirl, thereby rotating the arc foot and eliminating or reducing arc attachment induced erosion damage.

17 Claims, 3 Drawing Sheets

PLASMA TORCH ELECTRODE

BACKGROUND OF THE INVENTION

This invention relates to plasma torches generally, and more specifically to a platelet cooled electrode for a plasma torch.

Plasma torches are commonly used for cutting, welding and spray bonding of workpieces in numerous applications such as toxic waste disposal, metal processing and ash vitrification. Plasma torches generally operate by directing a plasma consisting of ionized gas particles toward the workpiece. A gas to be ionized is channeled between a pair of electrodes and directed through an orifice at the front end of the torch. A high voltage is applied to the electrodes causing an arc to jump the gap between the electrodes, thereby heating the gas and causing it to ionize. The ionized gas flows through the orifice and appears as an arc or flame. In an alternate application, only a single electrode is used and a transferred or cutting arc jumps from the electrode directly to the workpiece.

During the operation of a conventional plasma torch, the torch becomes very hot, especially the surfaces of the electrodes that are directly exposed to the plasma arc. Sufficient cooling must be provided during normal operation to prevent these electrode surfaces from either melting or deteriorating too rapidly. To cool the electrodes, fluid coolant, such as water or gas, is directed through channels or passageways in the electrodes to transfer heat away from the hot electrode surfaces through convection. Typically, the electrodes are manufactured in one piece and the coolant channels are then machined into the finished electrodes using conventional techniques.

Among the drawbacks with conventional plasma torches is that the process of machining coolant channels into the electrodes is limited. It is extremely difficult to precisely machine the coolant channels so that an effective heat transfer area exists between the channels and the electrode surfaces that are exposed to the hot plasma gas. Therefore, these surfaces overheat and rapidly deteriorate with use.

Another drawback with conventional plasma torches is that the plasma arc passing through the electrodes attaches to the exposed surfaces and rapidly erodes these surfaces. Often, the plasma arc will attach only to specific localized areas on these surfaces which quickly overheats and erodes these areas and substantially decreases the life of the electrode.

SUMMARY OF THE INVENTION

The present invention is directed to a plasma torch that avoids the problems and disadvantages of the prior art. The invention accomplishes this goal by providing a plasma torch electrode having an array of coolant channels configured to significantly improve heat transfer characteristics of the electrode. According to the present invention, the array of channels is provided using a platelet construction. Specifically, in the preferred embodiments, the plasma torch electrode comprises multiple platelets that are stacked together. The platelets have openings that are oriented to form a bore adapted for generating a plasma arc. The platelets also have apertures that are arranged to form channels for receiving coolant. This platelet construction advantageously permits precision fabrication of the coolant channels so that an effective heat transfer area can be created between the coolant channels and the inner wall surface of the bore.

The coolant channels are preferably formed so that the distance between the inner wall surface of the bore and the coolant channels is extremely small, thereby improving heat transfer between the coolant and this heated surface. The coolant channels also preferably extend substantially along the entire length of the bore to increase the heat transfer area between the coolant and the bore surface. This configuration reduces the temperature of this surface during operation of the plasma torch, thereby reducing erosion and increasing the lifetime of the electrode. With platelet construction, the coolant channel walls are essentially straight. This effectively eliminates stagnant flow regions which could develop in curved channels and cause liquid coolants to boil.

In a first embodiment, the apertures preferably are oriented to form a plurality of axial coolant channels which are arranged around the electrode bore. Preferably, these channels are positioned concentrically around the bore to facilitate uniform heat transfer between the coolant flowing through the channels and the inner wall surface of the bore.

In a second embodiment, the foregoing arrangement is modified so that the platelets include additional openings that are aligned to form a gas channel having an inlet adapted for coupling to a source of gas. The platelets may also have slots to fluidly couple the gas channel with the bore of the electrode. The gas protects the inner wall surface of the bore from chemical oxidation and facilitates cooling by creating a cool gas barrier along this surface. The slots are oriented so that the gas flows in a non radial direction toward the bore. This causes the gas to swirl around the bore surface to enhance gas coverage of this surface. In addition, the swirling gas barrier causes the plasma arc to attach uniformly to the bore surface to minimize or eliminate local area attachment of the plasma arc.

In a third embodiment, the above configuration is modified so that a plurality of annular inserts, such as metal washers, are positioned within some of the platelets. The inserts extend into the bore of the electrode to act as a site for plasma arc attachment, thereby absorbing a substantial portion of the heat from the arc. Preferably, the inserts are made from metals having a high melting temperature, low vapor pressure and good oxidation resistance, such as zirconium or tungsten. This embodiment provides a high-temperature material where it is most needed, at the hot bore surface, while retaining copper for the main body of the electrode.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE PREFERRED EMBODIMENTS

Figure 1:
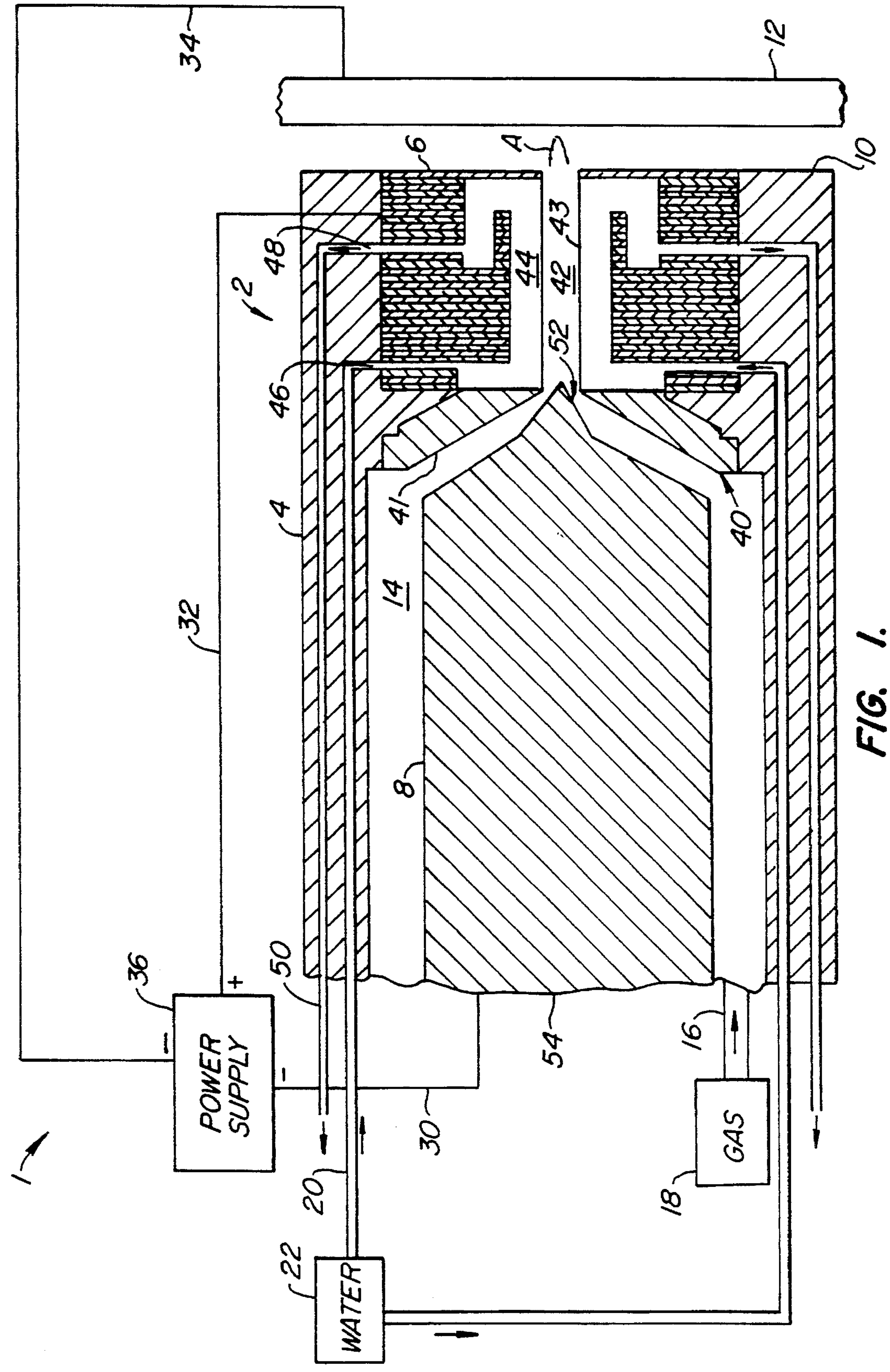
FIG. 1 is a schematic of a plasma torch system constructed according to the principles of the present invention with the plasma arc torch in longitudinal section.

Referring to the drawings in detail, wherein like numerals indicate like elements, plasma torch electrode 6 is shown constructed according to the principles of the present invention. It should be understood, however, that although plasma torch electrode 6 is shown and described as part of a particular plasma torch system 1, it is not intended to be limited in that manner. That is, electrode 6 can be used with other torches or plasma torch systems.

Referring to FIG. 1, plasma torch system 1 comprises plasma torch 2, power source 36, and gas and coolant sources 18 and 22. The power, gas and coolant sources can be of conventional construction. For example, power source 36 can be a DC or AC/DC power source suitable for plasma welding with plasma torch 2 connected thereto as is conventional in the art. As schematically shown in FIG. 1, power supply 36 is connected by lines 30 and 32 to electrode 8 and electrode 6, respectively, to apply a high-frequency voltage between electrode 6 and electrode 8 to generate an arc. Alternatively, power supply 36 can be connected by lines 32 and 34 to electrode 6 and workpiece 12 to generate a transferred arc.

As to the gas and coolant sources, gas source 18 provides a gas, such as a supply of compressed air, which is suitable for generating a plasma gas. Gas source 18 may also provide an inert gas, such as argon, for protecting electrode 6 from chemical oxidation caused by the plasma arc, as will be discussed in more detail below. Coolant source 22 is preferably a liquid reservoir connected to a conventional pump (not shown) for pumping liquid coolant, such as water, through coolant line 20 and into electrode 6. Alternatively, coolant source 22 may supply coolant in the form of a compressed gas to cool electrode 6.

Referring to FIG. 1, plasma torch 2 generally includes a housing 4 and electrodes 6 and 8, which are positioned within housing 4 such that electrode 8 extends into electrode 6 for generating an arc. More specifically, housing 4 has a working end 10 shown positioned near a workpiece 12. Housing 4 forms chamber 14 in which electrodes 6 and 8 are positioned. A gas line 16 couples chamber 14 to gas source 18 and a coolant line 20 couples electrode 6 to coolant source 22. It should be noted that other configurations for circulating coolant and plasma gas can be used in conjunction with the present invention.

Figure 2A:
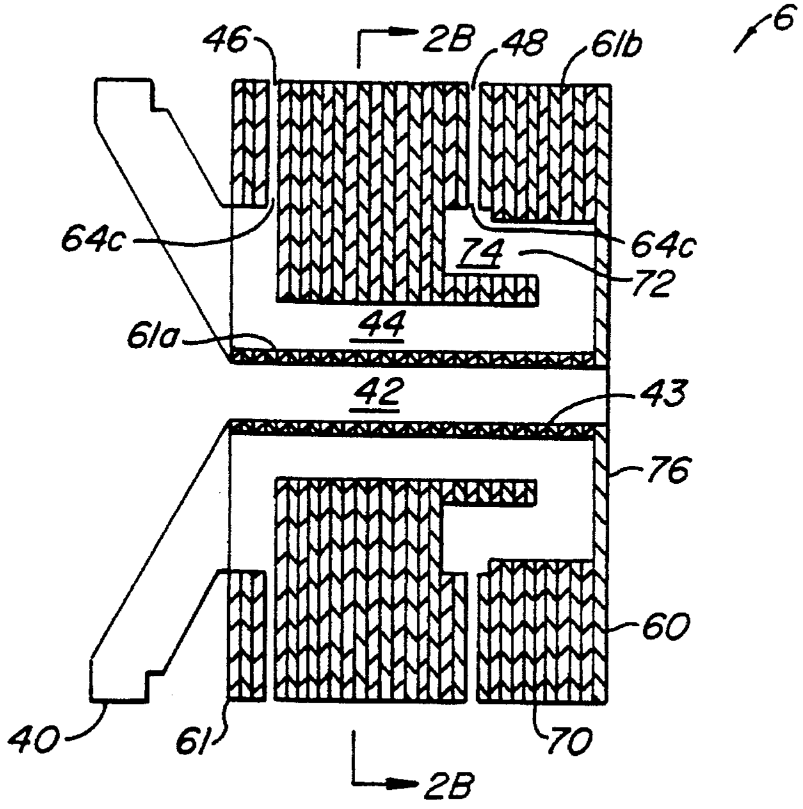
FIG. 2A is an enlarged view of the plasma arc torch electrode shown in FIG. 1.
Figure 2B:
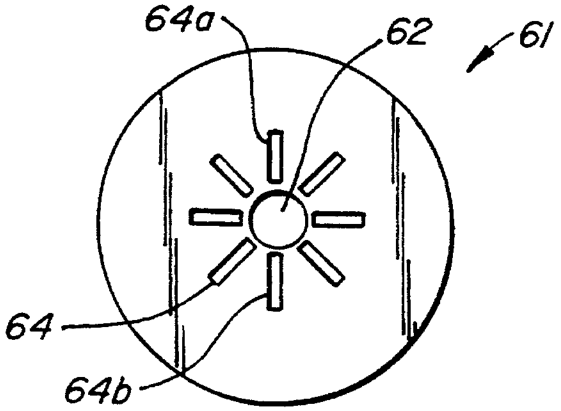
FIG. 2B is a sectional view of the electrode of FIG. 2A taken along line 2B—2B in FIG. 2A.

Referring to FIGS. 1, 2A and 2B, the preferred construction of electrode 6 will be discussed. Electrode 6 comprises a body 60 having holes formed therethrough and arranged so that the holes form a center bore or passageway 42 for receiving electrode 8 and axial coolant channels 44 for cooling bore 42. Electrode 6 further includes a member 40 for attaching electrode 6 to housing 4 in chamber 14 near working end 10. In the preferred embodiment, member 40 includes a frustoconical surface 41 that faces electrode 8 and forms an annular opening or passage between electrode 8 and member 40. The annular opening channels the torch gas into bore 42 such that the arc attaches at an inner surface 43 of bore 42.

Bore 42 is open-ended to allow the plasma arc to travel from electrode 8 to workpiece 12. Bore 42 forms inner surface 43 of electrode 6 that is exposed to the plasma arc during operation of plasma torch 2. Coolant channels 44 are preferably concentrically arranged around bore 42 to provide uniform heat transfer to exposed surface 43. Coolant channels 4 extend from inlets 46, which are coupled to coolant line 20, through electrode 6 to outlets 48, which are coupled to a discharge line 50 for discharging the coolant.

Electrode 8 has a first end portion 52 extending into bore 42 of electrode 6 and a second end portion 54 connected to power supply 36 by line 30. Electrode 8 is a cathode preferably made of thoriated tungsten as is conventional in the industry, but may be constructed of a variety of conventional materials as would be apparent to one of ordinary skill in the art.

In operation, power supply 36 provides a DC voltage between electrode 6 and electrode 8 to create an arc within bore 42. Concurrently, compressed gas from source 18 flows through gas line 16 into bore 42 and is ionized by the arc. This generates a plasma A that is emitted through the open end of electrode 6 and directed toward workpiece 12 to operate thereon for cutting, welding or spray bonding. In the transferred arc configuration, power supply 36 provides DC voltage between electrode 6 and workpiece 12. Heating of workpiece 12 occurs both by impingement of the plasma as well as by resistance heating resulting from current flow through workpiece 12.

Plasma arcs typically have a temperature between about 4,000° C. to 25,000° C., which could melt or quickly erode the exposed surface 43 of electrode 6. To cool electrode 6 during operation of the torch, coolant source 22 pumps water through coolant line 20 to inlets 46 of electrode 6. The water flows through coolant channels 44 and extracts heat from exposed surface 43, thereby cooling this surface and heating the water. The warmer water then exits electrode 6 through outlets 48 and is discharged through discharge line 50.

Referring to FIGS. 1, 2A and 2B, electrode 6 will be described in detail. Electrode 6 includes a plurality of generally longitudinally extending coolant channels 44 disposed adjacent to bore 42 to maximize heat transfer from the coolant channels 44 to the exposed surface 43 of bore 42. To facilitate manufacture of these channels, electrode 6 is preferably formed using platelet construction. In the preferred embodiment, electrode 6 generally comprises a stack of platelets 61 that have been joined together in any of a variety of ways, such as diffusion bonding or brazing. Diffusion bonding involves hot-pressing the platelets 61 together at elevated temperatures. The diffusion bonding causes grain growth between platelets 61, thereby generating a monolithic structure with properties of the parent material. Platelets 61 are thin sheets of metal, such as copper or a copper alloy. Copper has favorable characteristics for electrode 6 because it is very ductile and has a high thermal conductivity. Preferably, platelets 61 are generally circular and have a width of about 0.001 to 0.1 inch. However, platelets 61 may comprise other materials and may have other configurations, e.g., rectangular or triangular.

Referring to FIG. 2B, each platelet 61 has an opening 62 near its center and a plurality of coolant openings 64 disposed radially outward from opening 62. As discussed above, platelets 61 are arranged so that openings 62 form bore 42 and coolant openings 64 form coolant channels 44. For example, FIG. 2A shows two coolant channels 44 oriented 180° from each other corresponding to coolant openings 64*a* and 64*b* in FIG. 2B. Note that other configurations are possible, such as a single annular coolant channel that completely surrounds bore 42.

Opening 62 and coolant openings 64 are stamped, chemically etched, or laser cut into each platelet before the platelets are bonded together. The openings 62, 64 are superimposed onto adjacent platelets 61 to create the desired network or flowpath through the stack. This construction permits precision fabrication of channels 44 and bore 42. A suitable description of a method of chemical etching is disclosed in U.S. Pat. No. 3,413,704, which is incorporated herein by reference.

As shown in FIG. 2A, one of the platelets 61*a* has coolant openings 64*c* that extend radially to an outer surface 70 of electrode 6. These larger coolant openings 64*c* serve to fluidically couple coolant channels 44 to inlets 46. The small size of inlets 46 (i.e., the width of one platelet) compared to coolant line 20 provides an effective metering of the coolant flow to ensure even distribution to each coolant channel 44. The inlets 46 accomplish metering in the same manner as an orifice, creating a pressure drop as the fluid passes through them. The pressure drop across the inlets 46 is large compared to the pressure drop in the channels 44. Therefore, the flow rate is insensitive to perturbations in the channels 44 caused by arc heating effects.

A group of platelets 61*b* have apertures 72 that are disposed radially outward from coolant openings 64. Apertures 72 (not shown in FIG. 2B) are aligned to form axial extensions 74 of coolant channels 44 that fluidically couple coolant channels 44 to outlets 48. Extensions 74 serve to direct flow upstream and away from workpiece 12 before the coolant exits outlet 48. Like inlets 46, outlets 48 are fluidly coupled to extensions 74 by larger coolant openings 64*c* in one of the platelets 61*b*.

It will be noted that the invention is not limited to the coolant channel configuration described above and shown in FIGS. 2A and 2B. For example, coolant channels 44 may exit electrode 6 radially, without axial extensions 74, so that the coolant exits near the downstream end 10 of housing 4. In addition, more than one platelet 61 could have a coolant opening 64*c* that extends radially to outer surface 70 of electrode 6 to increase the width of outlets 48 and/or inlets 46 or to create more than one outlet 48 or inlet 46 for each coolant channel 44.

Coolant openings 64 are etched so that coolant channels 44 are formed immediately adjacent to bore 42 thereby reducing the distance between the hot plasma arc in bore 42 and the liquid coolant. With platelet construction, this distance can be as low as 0.03 inches, preferably about 0.03–0.05 inches. This facilitates heat transfer which reduces the temperature of the inner wall of electrode 6 and promotes temperature uniformity around exposed surface 43. In addition, coolant openings 64 are essentially the same size so that coolant channels 44 are essentially straight. This effectively eliminates stagnant flow regions which could develop in curved channels or channels having uneven walls and cause the water to quickly heat up to boiling temperature.

Coolant channels 44 are generally parallel to bore 42 and extend substantially along the entire length of bore 42. In the preferred embodiment, all of the platelets 61 have coolant openings 64 except for an end platelet 76. In this manner, coolant channels 44 extend downstream to end platelet 76 so that the coolant can flow almost completely along bore 42. This increases the surface area between bore 42 and coolant channels 44, thereby facilitating heat transfer between the coolant and exposed surface 43 of bore 42.

Figure 3A:
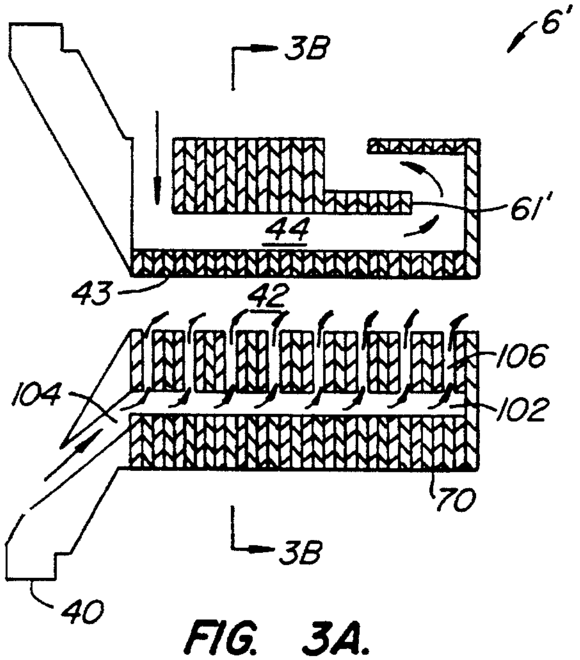
FIG. 3A is a longitudinal section of another embodiment of the plasma torch electrode of FIG. 1 according to the present invention.
Figure 3B:
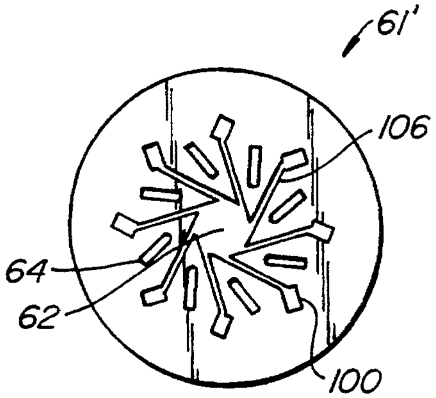
FIG. 3B is a sectional view of the electrode of FIG. 3A taken along line 3B—3B in FIG. 3A.

FIGS. 3A and 3B show another embodiment of electrode 6. In this embodiment, each platelet 61' further includes a plurality of gas openings 100 disposed radially outward from opening 62. Gas openings are aligned to form a plurality of gas channels 102 through electrode 6'. Gas channels 102 have inlets 104 coupled to a source of gas via a gas line (not shown). Some of the platelets 61' further include slots 106 that interconnect gas openings 100 to openings 62 so that gas channels 102 are fluidically coupled to bore 42.

With this configuration, a gas can be injected into bore 42 via slots 106 to protect surface 43 of electrode 6. The injected gas can be the same or different from the primary torch gas. It may be an inert gas, such as argon, which protects the surface from chemical oxidation. Slots 106 preferably extend in a non radial direction toward openings 62 so that the gas will swirl around the exposed surface 43 of electrode 6'. This promotes arc foot rotation thereby eliminating the erosion which occurs when the arc foot rotates too slowly, or not at all. In addition, the gas provides a cool barrier that will supplement the liquid coolant flowing through coolant channels 44.

As shown in FIG. 3B, gas openings 100 are preferably concentrically positioned around axial openings 62 to provide a uniform gas barrier around surface 43. Injecting gas through slots 106 allows gas openings 100 to be positioned away from bore 42, preferably a distance of about 0.1 to 0.2 inches. This relatively large distance ensures that the gas flow rate through gas channels 102 and into slots 106 will not be significantly affected by plasma pressure or temperature variations in bore 42 of electrode 6'.

Figure 4A:
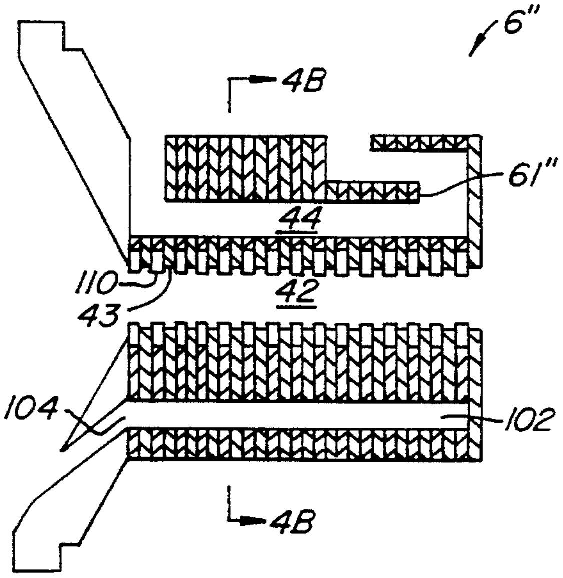
FIG. 4A is a longitudinal section of a further embodiment of the plasma torch electrode of FIG. 1 according to the present invention.
Figure 4B:
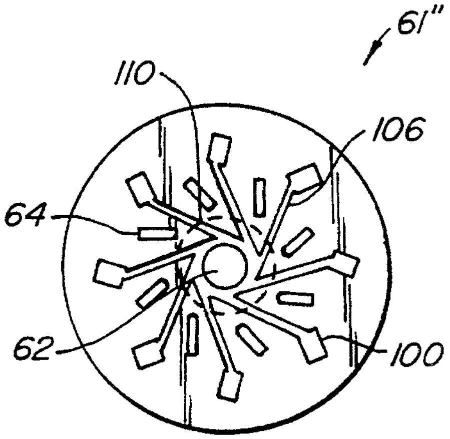
FIG. 4B is a sectional view of the electrode taken along line 4—4 in FIG. 4A.

FIGS. 4A and 4B illustrate a further embodiment of electrode 6". This embodiment includes gas channels 102 and coolant channels 44 as in the previous embodiment. To further protect electrode 6", annular inserts 110 are positioned within the openings 62 of some of the platelets 61". As shown in FIG. 4A, inserts 110 are preferably positioned in alternate platelets 61", but other configurations will be apparent to one of ordinary skill in the art. Annular inserts 110 extend into bore 42 so that they are closer to the plasma arc than the exposed surface 43 of electrode 6". Therefore, the plasma arc will attach to inserts 110, rather than electrode 6", so that inserts 110 will absorb the majority of the heat from the plasma arc.

Inserts 110 are preferably made from a material having a high melting temperature, low vapor pressure and good oxidation resistance. Preferably, this material is zirconium, iridium or platinum in an oxidizing environment or a high-temperature material such as tungsten in an inert environment. Typically, it is difficult to manufacture an electrode entirely from these high-temperature materials because they are difficult to machine. Providing a material such as zirconium or tungsten only where it is needed (i.e., at the hot gas surface) decreases erosion, thereby increasing the lifetime of the electrode while maintaining copper for the electrode body.

The above is a detailed description of various embodiments of the invention. It is recognized that departures from the disclosed embodiments may be made within the scope of the invention and obvious modifications will occur to a person skilled in the art. The full scope of the invention is set out in the claims that follow and their equivalents. Accordingly, the claims and specification should not be construed to unduly narrow the full scope of protection to which the invention is entitled.

What is claimed is:

1. A plasma torch electrode comprising multiple platelets that are joined together to form an electrical connection therebetween, each platelet having a perimetrical side surface and a first opening spaced radially inward therefrom, said platelets being arranged so that said openings are aligned to form a bore through said electrode, a plurality of said platelets having apertures that are aligned to form a channel, said channel having an inlet adapted for coupling to a source of coolant.

2. The electrode of claim 1 wherein a substantial portion of said channel is generally parallel to a substantial portion of said bore.

3. The electrode of claim 1 wherein said apertures are aligned to form multiple channels, said bore being concentrically positioned within said multiple channels.

4. The electrode of claim 1 wherein said channel is adjacent to and discrete from said bore.

5. The electrode of claim 1 wherein said bore and said channel are 0.03 to 0.05 inches apart.

6. The electrode of claim 1 wherein said multiple platelets include an end platelet, said channel extending through said electrode to said end platelet.

7. The electrode of claim 1 wherein said channel is bounded by inner walls that are essentially straight.

8. The electrode of claim 1 wherein said platelets have a width of about 0.001 to 0.1 inch.

9. A plasma torch electrode comprising multiple platelets that are joined together to form an electrical connection therebetween, each platelet having a perimetrical side surface and a first opening spaced radially inward therefrom, said platelets being arranged so that said first openings are aligned to form a first passageway extending through said electrode, said first passageway being adapted for generating an arc within said first passageway, a group of said platelets having second openings that are aligned to form a second passageway extending through said group of said platelets, said second passageway having an inlet adapted for coupling to a source of coolant.

10. The electrode of claim 9 wherein a second group of said platelets have third openings spaced apart from said second openings and aligned to form a third passageway extending through said second group of said platelets, said third passageway having an inlet adapted for coupling to a source of gas.

11. The electrode of claim 10 wherein said second group of said platelets have slots fluidically coupling the third openings to the first openings for introducing gas into said first passageway.

12. The electrode of claim 11 wherein said slots extend in a non radial direction to permit gas injection with swirl.

13. The electrode of claim 9 further including a plurality of annular inserts positioned within a second group of said platelets so that said inserts extend into said first passageway, the inserts being adapted to protect said electrode from said arc.

14. The electrode of claim 13 wherein the inserts are made of a material selected from the group consisting essentially of tungsten, iridium, platinum and zirconium.

15. The electrode of claim 9 wherein a second group of said platelets have third openings spaced radially outward from said second openings and aligned to form an axial extension of said second passageway, said axial extension having an outlet for discharging coolant.

16. A plasma torch comprising:

a housing;

a first electrode positioned in said housing, said first electrode having multiple platelets that contact each other to form an electrical connection therebetween, each platelet having a perimetrical side surface and a first opening spaced radially inward therefrom, said platelets being arranged so that said first openings are aligned to form a first passageway through said member, a group of said platelets having second openings that are aligned to form a second passageway extending through said group of said platelets, said second passageway having an inlet and an outlet;

a second electrode having a first portion adapted for coupling to a power source and a second portion extending into said first passageway of said member; and a gas line within said housing having a first end connected to said first passageway and a second end adapted for coupling to a gas source for introducing gas into said first passageway.

17. The plasma torch of claim 16 further including a coolant line within said housing having a first portion connected to said inlet of said second passageway and a second portion adapted for coupling to a source of coolant for introducing coolant into said second passageway.

* * * * *